United States Patent
Shimamoto et al.

(10) Patent No.: US 10,666,178 B2
(45) Date of Patent: May 26, 2020

(54) MOTOR CONTROL DEVICE AND CONTROL METHOD

(71) Applicant: KABUSHIKI KAISHA YASKAWA DENKI, Kitakyushu-shi, Fukuoka (JP)

(72) Inventors: Keita Shimamoto, Fukuoka (JP); Shinya Morimoto, Fukuoka (JP)

(*) Notice: Subject to any disclaimer, the term of this patent is extended or adjusted under 35 U.S.C. 154(b) by 0 days.

(21) Appl. No.: 16/053,807

(22) Filed: Aug. 3, 2018

(65) Prior Publication Data
US 2019/0044467 A1 Feb. 7, 2019

(30) Foreign Application Priority Data

Aug. 7, 2017 (JP) .................................. 2017-152644

(51) Int. Cl.
*H02P 21/00* (2016.01)
*H02P 21/09* (2016.01)
(Continued)

(52) U.S. Cl.
CPC .............. *H02P 21/09* (2016.02); *H02P 6/18* (2013.01); *H02P 6/183* (2013.01); *H02P 21/18* (2016.02); *H02P 21/24* (2016.02); *H02P 2203/11* (2013.01)

(58) Field of Classification Search
CPC .................................. H02P 21/09; H02P 21/18
(Continued)

(56) References Cited

U.S. PATENT DOCUMENTS 9,300,234 B2 3/2016 Kakihara et al.
2008/0042606 A1* 2/2008 Chen .................... B60L 15/025
318/474
(Continued)

FOREIGN PATENT DOCUMENTS

EP 2566045 3/2013
EP 2897282 7/2015
(Continued)

OTHER PUBLICATIONS

Office Action issued in Japanese Patent Application No. P2017-152644, dated Mar. 19, 2019 (with English partial translation).
(Continued)

*Primary Examiner* — Erick D Glass
(74) *Attorney, Agent, or Firm* — Soei Patent & Law Firm

(57) ABSTRACT

A control device includes an estimation module configured to repeatedly calculate an angle estimation value correlated with a magnetic pole position of a rotating electric machine, and a storage module configured to store the angle estimation value. The estimation module includes a response information calculation module configured to calculate response information indicating a current change resulting from a change in an output voltage to the rotating electric machine or a voltage change resulting from a change in an output current to the rotating electric machine, a coefficient calculation module configured to calculate an interference coefficient correlated with electromagnetic mutual interference between coordinate axes of an orthogonal coordinate system of the rotating electric machine based on a past angle estimation value stored in the storage module, and an angle calculation module configured to calculate an angle estimation value based on the response information and the interference coefficient.

16 Claims, 6 Drawing Sheets

(51) Int. Cl.
*H02P 21/18* (2016.01)
*H02P 6/18* (2016.01)
*H02P 21/24* (2016.01)

(58) Field of Classification Search
USPC .................................................. 318/400.02
See application file for complete search history.

(56) References Cited

U.S. PATENT DOCUMENTS

| | | | | |
|---|---|---|---|---|
| 2010/0090632 | A1* | 4/2010 | Maekawa | H02P 6/18 |
| | | | | 318/400.33 |
| 2014/0145660 | A1 | 5/2014 | Shimada et al. | |
| 2014/0253001 | A1* | 9/2014 | Hinata | H02P 6/186 |
| | | | | 318/400.02 |
| 2015/0333682 | A1* | 11/2015 | Amemiya | H02P 21/05 |
| | | | | 318/400.02 |

FOREIGN PATENT DOCUMENTS

| | | |
|---|---|---|
| JP | 2006-014496 | 1/2006 |
| JP | 2013-090552 | 5/2013 |
| JP | 2015-136237 | 7/2015 |

OTHER PUBLICATIONS

Yi Li et al, "Improved Rotor-Position Estimation by Signal Injection in Brushless AC Motors, Accounting for Cross-Coupling Magnetic Saturation", IEEE Transactions on Industry Applications, vol. 45, No. 5, Sep. 18, 2009, p. 1843-p. 1850.

Extended Search Report in corresponding European Application No. 18187533.7, dated Jan. 7, 2019.

Notice of Allowance issued in Japanese Patent Application No. P2017-152644, dated Jun. 4, 2019.

* cited by examiner

MOTOR CONTROL DEVICE AND CONTROL METHOD

CROSS-REFERENCE TO RELATED APPLICATION

This application is based upon and claims the benefit of priority from Japanese Patent Application No. 2017-152644, filed on Aug. 7, 2017, the entire contents of which are incorporated herein by reference.

BACKGROUND

1. Field

The present disclosure relates to a control device and a control method.

2. Description of the Related Art

Japanese Unexamined Patent Publication No. 2013-090552 describes a rotating electric machine control device that performs so-called sensorless vector control of applying a high-frequency current to a rotating electric machine which includes a rotor with saliency, estimating a magnetic pole direction of the rotor based on a high-frequency component included in a voltage command as a response component to the high-frequency current, and controlling the rotating electric machine. The rotating electric machine control device calculates an error of an estimation value in the magnetic pole direction which is generated by magnetic flux interference between dq axes and performs correction based on the error.

SUMMARY

A control device disclosed herein includes an estimation module configured to repeatedly calculate an angle estimation value correlated with a magnetic pole position of an electric motor, and a storage module configured to store the angle estimation value. The estimation module includes a response information calculation module configured to calculate response information indicating a current change resulting from a change in an output voltage to the electric motor or a voltage change resulting from a change in an output current to the electric motor, a coefficient calculation module configured to calculate an interference coefficient correlated with electromagnetic mutual interference between coordinate axes of an orthogonal coordinate system of the electric motor based on a past angle estimation value stored in the storage module, and an angle calculation module configured to calculate an angle estimation value based on the response information and the interference coefficient.

A control method disclosed herein includes repeatedly calculating an angle estimation value correlated with a magnetic pole position of an electric motor, and storing the angle estimation value. Calculating the angle estimation value includes calculating response information indicating a current change resulting from a change in an output voltage to the electric motor or a voltage change resulting from a change in an output current to the electric motor, calculating an interference coefficient correlated with electromagnetic mutual interference between coordinate axes of an orthogonal coordinate system of the electric motor based on an angle estimation value stored in the past, and calculating an angle estimation value based on the response information and the interference coefficient.

Additionally, a control device disclosed herein includes an estimation module configured to repeatedly calculate an angle estimation value correlated with a magnetic pole position of an electric motor, and a storage module configured to store the angle estimation value. The estimation module includes a response information calculation module configured to calculate response information indicating a current change resulting from a change in an output voltage to the electric motor or a voltage change resulting from a change in an output current to the electric motor, and an angle calculation module configured to calculate an angle estimation value based on the response information and a past angle estimation value stored in the storage module.

DETAILED DESCRIPTION

In the following description, with reference to the drawings, the same reference numbers are assigned to the same components or to similar components having the same function, and overlapping description is omitted.

[Control Device]

Figure 1:
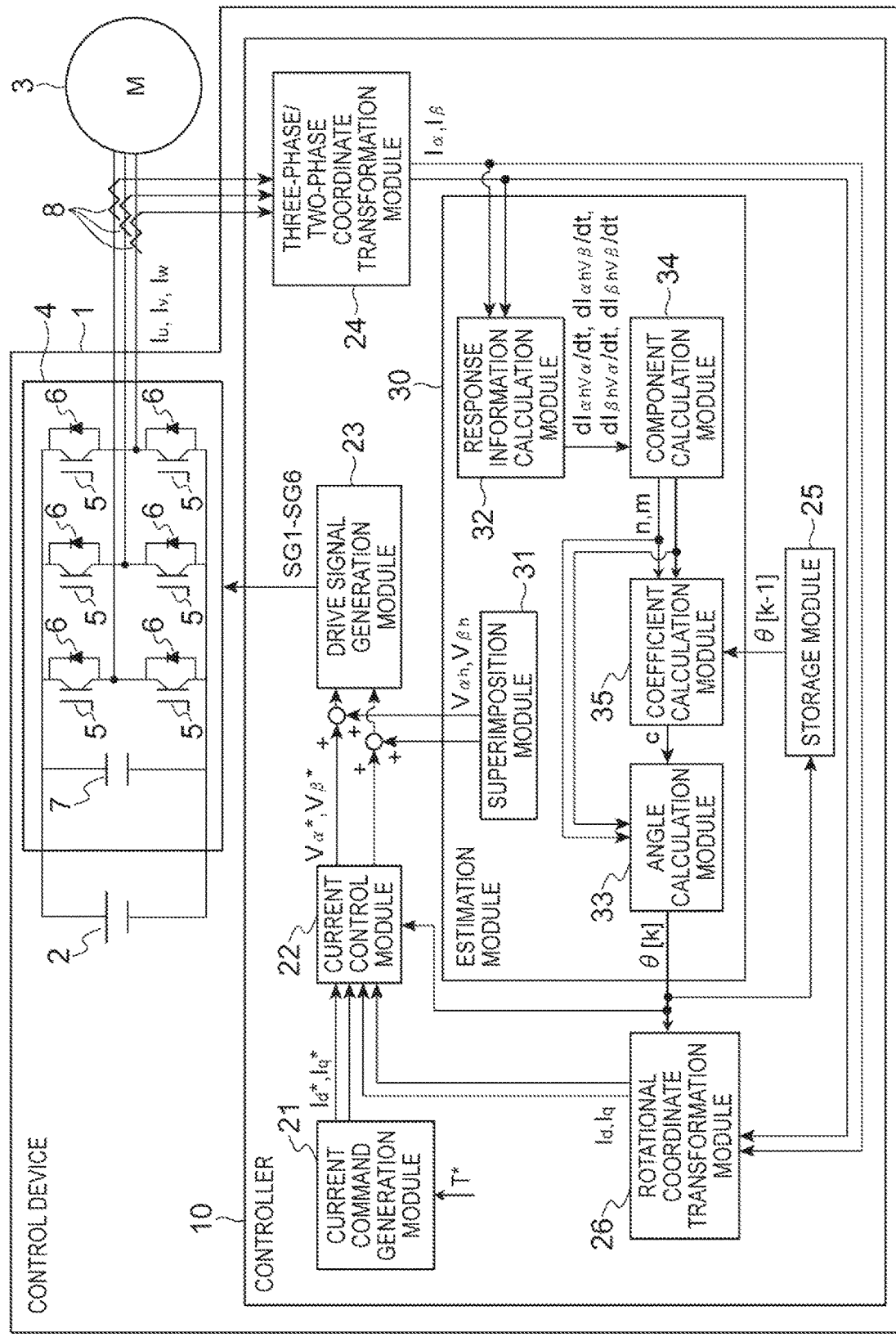
FIG. 1 is a schematic view illustrating a configuration of a control device.

A control device 1 may include an inverter to control an electric motor. As illustrated in FIG. 1, the control device 1 is placed between a DC power supply 2 and the electric motor (such as rotating electric machine 3). Although the specification refers to electric motors in some examples, one of ordinary skill in the art would appreciate that an electric motor may include various types of electrical devices and rotating machines such as electric generators and dynamos. The control device 1 converts DC power supplied by the DC power supply 2 into three-phase AC power for driving the rotating electric machine 3, and supplies this power to the rotating electric machine 3. In some of the following examples, phases of the three-phase AC power will be described as a u-phase, a v-phase, and a w-phase.

(Rotating Electric Machine)

An example configuration of the rotating electric machine 3 controlled by the control device 1 includes an AC electric motor including a rotator having a magnetic pole, and a stator including a winding wire. The winding wire includes a u-phase winding wire, a v-phase winding wire, and a w-phase winding wire. In the rotating electric machine 3, when AC power is supplied to the winding wire of the stator, the winding wire generates a magnetic field and the rotator is rotated by this magnetic field. The magnetic pole of the rotator may be a permanent magnet or an electromagnet.

The rotating electric machine 3 has saliency. Here, having saliency means that an inductance in a d-axis direction and an inductance in a q-axis direction are different. The d-axis direction is a magnetic pole direction of the rotator. The q-axis direction is a direction that is vertical to the d-axis direction and that is vertical to a rotational axis of the rotator. Thus, a dq coordinate system (orthogonal coordinate system including two axes in the d-axis direction and the q-axis direction) is a rotating reference frame that rotates along a rotation of the rotator. The inductance in the d-axis direction is a value that is magnetic flux in the d-axis direction differentiated by current in the d-axis direction. The inductance in the q-axis direction is a value that is magnetic flux in the q-axis direction differentiated by current in the q-axis direction. The current in the d-axis direction and the q-axis direction includes a d-axis component and a q-axis component of current flowing in the three-phase winding wires.

Here, an αβ coordinate system that is an orthogonal coordinate system including two axes of an α-axis and a β-axis is set as a fixed coordinate system, which is fixed with respect to the stator, on a rotational plane of the rotator (that is, on a plane orthogonal to the rotational axis of the rotator). The α-axis is oriented along a direction of a magnetic field generated by the u-phase winding wire, and the β-axis is oriented along a direction orthogonal to both of the α-axis and a rotational axis direction of the rotator.

The rotating electric machine 3 may include, for example, an interior permanent magnet synchronous motor (IPMSM). However, the rotating electric machine 3 may include other kinds of electric motors as long as saliency is maintained. The rotating electric machine 3 may be an induction motor.

(Configuration of Control Device)

The control device 1 includes a power converter (or power conversion circuitry) 4, a current detector 8, and a controller (or control circuitry) 10. The power converter 4 outputs the above-described three-phase AC power to the rotating electric machine 3 by switching on/off between two DC buses connected to the DC power supply 2 and three output lines connected to the rotating electric machine 3.

The power converter 4 includes, for example, six switching elements 5, six diodes 6, and a capacitor 7.

The six switching elements 5 include two switching elements 5 respectively connected between the two DC buses and a u-phase output line, two switching elements 5 respectively connected between the two DC buses and a v-phase output line, and two switching elements 5 respectively connected between the two DC buses and a w-phase output line. Each of the switching elements 5 may include, for example, an insulated gate bipolar transistor (IGBT), but may include a different element such as a metal-oxide-semiconductor field effect transistor (MOSFET). Each of the switching elements 5 may be configured to switch between an on state and an off state according to a drive signal from the controller 10.

The six diodes 6 are respectively connected to the six switching elements 5 in parallel. The diodes 6 function as freewheeling diodes that pass current to an opposite side of a conduction direction of the switching elements 5.

The capacitor 7 is connected between the DC buses and performs a smoothing function of a variation in voltage which is associated with a switching operation of the switching elements 5. The capacitor 7 may include, for example, an aluminum electrolytic capacitor.

The current detector 8 detects current supplied by the power converter 4 to the rotating electric machine 3. The current detector 8 may include, for example, a current sensor or a Hall effect sensor.

The controller 10 generates drive signals SG1 to SG6 to switch on/off the switching elements 5 based on a torque command T* input from the outside and a current value detected by the current detector 8, and respectively outputs these drive signals SG1 to SG6 to the six switching elements 5.

An example configuration of the controller 10 may include a current command generation module 21, a current control module 22, a drive signal generation module 23, a three-phase/two-phase coordinate transformation module 24, an estimation module 30, a storage module 25, and a rotational coordinate transformation module 26.

The current command generation module 21 generates a d-axis current command value $I_d^*$ and a q-axis current command value $I_q^*$ based on the torque command T* input from the outside of the controller 10.

The current control module 22 calculates a d-axis voltage command value $V_d^*$ and a q-axis voltage command value $V_q^*$ in such a manner that a deviation between the d-axis current command value $I_d^*$ and a d-axis current detection value $I_d$ is reduced and a deviation between the q-axis current command value $I_q^*$ and a q-axis current detection value $I_q$ is reduced, and converts the d-axis voltage command value $V_d^*$ and the q-axis voltage command value $V_q^*$ into an α-axis voltage command value $V_\alpha^*$ and a β-axis voltage command value $V_\beta^*$ of the αβ coordinate system. For example, the current control module 22 calculates the d-axis voltage command value $V_d^*$ and the q-axis voltage command value $V_q^*$ by a proportional (P) operation. The current control module 22 may calculate the d-axis voltage command value $V_d^*$ and the q-axis voltage command value $V_q^*$ by a proportional-integral (PI) operation or may calculate the d-axis voltage command value $V_d^*$ and the q-axis voltage command value $V_q^*$ by a proportional-integral-derivative (PID) operation.

The drive signal generation module 23 generates the above-described drive signals SG1 to SG6 according to the α-axis voltage command value $V_\alpha^*$ and the β-axis voltage command value $V_\beta^*$ and respectively outputs these signals to the six switching elements 5. For example, the drive signal generation module 23 generates the drive signals SG1 to SG6 by a space vector modulation method. The drive signal generation module 23 may generate the drive signals SG1 to SG6 by a pulse-width modulation method.

The three-phase/two-phase coordinate transformation module 24 performs coordinate transformation of a current value of the three-phase AC power. The current value is detected by the current detector 8 into the αβ coordinate system, and the three-phase/two-phase coordinate transformation module 24 calculates an α-axis current detection value $I_\alpha$ and a β-axis current detection value $I_\beta$.

The estimation module 30 repeatedly calculates an angle estimation value correlated with a magnetic pole position of the rotating electric machine 3 based on the α-axis current detection value $I_\alpha$ and the β-axis current detection value $I_\beta$ calculated by the three-phase/two-phase coordinate transformation module 24. In addition to including a case in which the angle estimation value is equal to the magnetic pole position, being correlated with the magnetic pole position may be understood to include a case in which the angle estimation value is deviated from the magnetic pole position for a certain value, and a case in which the angle estimation value is acquired by multiplication of an angle indicating the magnetic pole position by a predetermined multiplication factor (such as a multiplication factor of two, or double the angle). The magnetic pole position may be understood to mean an angle between the magnetic pole direction of the rotator of the rotating electric machine 3 and one direction (such as α-axis direction) in the coordinate system fixed to the stator of the rotating electric machine 3 (αβ coordinate system). The storage module 25 stores the angle estimation value calculated by the angle calculation module.

The rotational coordinate transformation module 26 performs coordinate transformation of the α-axis current detection value $I_\alpha$ and the β-axis current detection value $I_\beta$ into the d-axis current detection value $I_d$ and the q-axis current detection value $I_q$ of the dq coordinate system (rotating reference frame) by rotational coordinate transformation using the angle estimation value calculated by the estimation module 30. The d-axis current detection value $I_d$ and the q-axis current detection value $I_q$ are fed back to the above-described current control module 22.

(Estimation Module)

An example configuration of the estimation module 30 may be configured to calculate response information indicating a current change resulting from a change in an output voltage to the rotating electric machine 3 or a voltage change resulting from a change in an output current to the rotating electric machine 3. The response information may indicate the change in output voltage to the electric motor relative to the change in output current to the electric motor. In some examples, the estimation module 30 may be configured to calculate the response information indicating a change in a first electrical property associated with the electric motor selected from a group consisting of the output voltage and the output current. The change in the first electrical property may result from a change in a second electrical property of the electric motor selected from the group. For example, the change in the first electrical property may include a current change resulting from the change in the output voltage to the electric motor, or a voltage change resulting from the change in the output current to the electric motor. Additionally, the estimation module 30 may be configured to calculate an angle estimation value based on the response information and an angle estimation value stored in the past. In some examples, the estimation module 30 calculates response information indicating a current change resulting from a change in an output voltage to the rotating electric machine 3 or a voltage change resulting from a change in an output current to the rotating electric machine 3, calculates an interference coefficient correlated with electromagnetic mutual interference between coordinate axes of the orthogonal coordinate system of the rotating electric machine 3 based on an angle estimation value stored in the past, and calculates an angle estimation value based on the response information and the interference coefficient.

An example configuration of the estimation module 30 may include, as functional configurations (hereinafter, referred to as "functional modules"), a superimposition module 31, a response information calculation module 32, an angle calculation module 33, a component calculation module 34, and a coefficient calculation module 35.

The superimposition module 31 superimposes a high-frequency signal on an output voltage or output current to the rotating electric machine 3. Note that the high-frequency signal may be set in such a manner as not to influence an operation of the rotating electric machine 3. For example, a frequency of the high-frequency signal is set sufficiently higher than a frequency to which the rotating electric machine 3 can mechanically respond.

In some examples, the superimposition module 31 superimposes, on an α-axis voltage command value $V_\alpha^*$ and a β-axis voltage command value $V_\beta^*$ output from the current control module 22, a high-frequency voltage indicated by a vector $(V_{\alpha h}, V_{\beta h})^T$ of the following expression (1) in the αβ coordinate system.

[Expression 1]

$$\begin{bmatrix} V_{\alpha h} \\ V_{\beta h} \end{bmatrix} = \begin{cases} [V_{inj}\ 0]^T, & 0 < t \le (T/4) \\ [0\ V_{inj}]^T, & (T/4) < t \le (T/2) \\ [-V_{inj}\ 0]^T, & (T/2) < t \le (3T/4) \\ [0\ -V_{inj}]^T, & (3T/4) < t \le T \end{cases} \quad (1)$$

Figure 2:
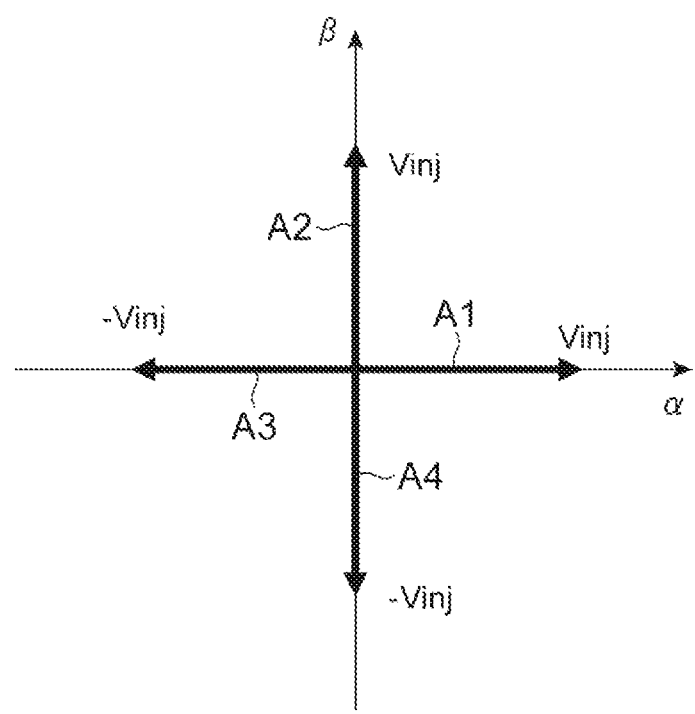
FIG. 2 is a view illustrating a superimposed voltage vector.

$V_{\alpha h}$: α-axis component of high-frequency voltage
$V_{\beta h}$: β-axis component of high-frequency voltage
T: period of high-frequency voltage
$V_{inj}$: magnitude of voltage vector FIG. 2 is a view in which a voltage vector superimposed by the superimposition module 31 is illustrated in the αβ coordinate system. As illustrated in FIG. 2, the superimposition module 31 may be configured to apply, in each period, a first voltage vector indicated by arrow A1 in time $0 \le t \le T/4$, a second voltage vector indicated by arrow A2 in time $T/4 < t \le T/2$, a third voltage vector indicated by arrow A3 in time $T/2 < t \le 3T/4$, and a fourth voltage vector indicated by arrow A4 in time $3T/4 < t \le T$. The superimposition module 31 may repeatedly apply the four voltage vectors in each subsequent period.

The response information calculation module 32 calculates response information indicating a current change resulting from a change in an output voltage to the rotating electric machine 3 or a voltage change resulting from a change in an output current to the rotating electric machine 3. For example, the response information calculation module 32 calculates a current change resulting from a change in an output voltage to the rotating electric machine 3. The response information calculation module 32 may be configured to extract, from a detection value of current, a current change corresponding to a component for calculation of an angle estimation value (such as high-frequency voltage superimposed by superimposition module 31) in a change in the output voltage to the rotating electric machine 3.

The response information calculation module 32 calculates response information in a coordinate system fixed to a stator of the rotating electric machine 3 (αβ coordinate system). For example, the response information calculation module 32 extracts, from an α-axis current detection value $I_\alpha$ and a β-axis current detection value $I_\beta$ calculated by the three-phase/two-phase coordinate transformation module 24, a high-frequency signal corresponding to the high-frequency voltage superimposed by the superimposition module 31. The response information calculation module 32 may be configured to calculate response information in a different coordinate system (such as rotating reference frame that rotate along with rotator).

The angle calculation module 33 calculates an angle estimation value based on the response information detected by the response information calculation module 32 and the past angle estimation value stored in the storage module 25. In some examples, the angle calculation module 33 calculates an angle estimation value based on a sine component of an angle estimation value of a case where mutual interference is ignored, a cosine component of the angle estimation value of a case where the mutual interference is ignored, and an interference coefficient.

The sine component of the angle estimation value is a numerator of a tangent of the angle estimation value, and the cosine component of the angle estimation value is a denominator of the tangent of the angle estimation value. The sine component and the cosine component are calculated by the component calculation module 34 (described later) based on the response information detected by the response information calculation module 32.

The interference coefficient is a coefficient correlated with electromagnetic mutual interference between coordinate axes (such as between d-axis and q-axis) of the orthogonal coordinate system. The interference coefficient is calculated by the coefficient calculation module 35 (described later) based on the past angle estimation value stored in the storage module 25.

For example, the angle calculation module 33 calculates an angle estimation value by the following expression (2).

[Expression 2]

$$\theta = \frac{1}{2}\tan^{-1}\left(\frac{n-cm}{cn+m}\right) \quad (2)$$

θ: angle estimation value
c: interference coefficient
n: sine component of 2θ of case where mutual interference is ignored
m: cosine component of 2θ of case where mutual interference is ignored The component calculation module 34 calculates the sine component n and the cosine component m based on the response information. For example, the component calculation module 34 calculates the sine component n and the cosine component m by the following expressions (3) and (4).

[Expression 3]

$$n = \frac{d}{dt}I_{\alpha h V\alpha} - \frac{d}{dt}I_{\beta h V\beta} \quad (3)$$

[Expression 4]

$$m = -\frac{d}{dt}I_{\alpha h V\beta} - \frac{d}{dt}I_{\beta h V\alpha} \quad (4)$$

$(d/dt)I_{\alpha h V\alpha}$: change in α-axis current when direction of superimposed voltage vector is positive in superimposition of voltage in α-axis direction
$(d/dt)I_{\alpha h V\beta}$: change in β-axis current when direction of superimposed voltage vector is positive in superimposition of voltage in β-axis direction
$(d/dt)I_{\beta h V\alpha}$: change in β-axis current when direction of superimposed voltage vector is positive in superimposition of voltage in β-axis direction
$(d/dt)I_{\beta h V\beta}$: change in β-axis current when direction of superimposed voltage vector is positive in superimposition of voltage in β-axis direction Additional information associated with the calculation of the sine component n and the cosine component m by the above expressions is described as follows. A voltage equation of a high-frequency component in the αβ coordinate system, in which mutual interference is ignored or excluded, is expressed by the following equation.

[Expression 5]

$$\begin{bmatrix} V_{\alpha h} \\ V_{\beta h} \end{bmatrix} = \begin{bmatrix} L + l\cos 2\theta & l\sin 2\theta \\ l\sin 2\theta & L - l\cos 2\theta \end{bmatrix} \frac{d}{dt}\begin{bmatrix} I_{\alpha h} \\ I_{\beta h} \end{bmatrix} \quad (5)$$

$V_{\alpha h}$: high-frequency component of α-axis voltage
$V_{\beta h}$: high-frequency component of β-axis voltage
$I_{\alpha h}$: high-frequency component of α-axis current
$I_{\beta h}$: high-frequency component of β-axis current L and l in the above expression (5) are expressed by the following equations.

[Expression 6]

$$L = \frac{L_d + L_q}{2} \quad (6)$$

[Expression 7]

$$l = \frac{L_d - L_q}{2} \quad (7)$$

$L_d$: value that is d-axis magnetic flux differentiated by d-axis current
$L_q$: value that is q-axis magnetic flux differentiated by q-axis current From the above expression (5), a tangent of 2θ is derived from the following expression (8).

[Expression 8]

$$\tan 2\theta = \frac{\frac{d}{dt}I_{\alpha h V\alpha} - \frac{d}{dt}I_{\beta h V\beta}}{-\frac{d}{dt}I_{\alpha h V\beta} - \frac{d}{dt}I_{\beta h V\alpha}} \quad (8)$$

Thus, from the expression (2) and the expression (8), the sine component n that is the numerator of the tangent is calculated by expression (3) and the cosine component m that is the denominator of the tangent is calculated by expression (4).

The coefficient calculation module 35 calculates the above interference coefficient c based on the past angle estimation value stored in the storage module 25. The coefficient calculation module 35 may calculate the interference coefficient c based on the past angle estimation value stored in the storage module 25 and the response information detected by the response information calculation module 32. For example, the coefficient calculation module 35 calculates the interference coefficient c by the following expression (9).

[Expression 9]

$$c = \frac{n[k]\cos 2\theta[k-1] - m[k]\sin 2\theta[k-1]}{n[k]\sin 2\theta[k-1] + m[k]\cos 2\theta[k-1]} \quad (9)$$

n[k]: sine component n in sampling period to be calculation object of angle estimation value (hereinafter, referred to as "object sampling period").
m[k]: cosine component m in object sampling period
θ[k−1]: angle estimation value in previous sampling period of object sampling period Additional information associated with the calculation of the interference coefficient c by the above expression (9) is described. A voltage equation of a high-frequency component in the αl coordinate system, in which mutual interference is not ignored, is expressed by the following equation.

[Expression 10]

$$\begin{bmatrix} V_{\alpha h} \\ V_{\beta h} \end{bmatrix} = \begin{bmatrix} L + l\cos2\theta - L_x\sin2\theta & l\sin2\theta - l_x + L_x\cos2\theta \\ l\sin2\theta + l_x + L_x\cos2\theta & L - l\cos2\theta + L_x\sin2\theta \end{bmatrix} \frac{d}{dt}\begin{bmatrix} I_{\alpha h} \\ I_{\beta h} \end{bmatrix} \quad (10)$$

Lx and lx in the above expression (10) are expressed by the following equations.

[Expression 11]

$$L_x = \frac{L_{qd} + L_{dq}}{2} \quad (11)$$

[Expression 12]

$$l_x = \frac{L_{qd} + L_{dq}}{2} \quad (12)$$

$L_{qd}$: value that is q-axis magnetic flux differentiated by d-axis current
$L_{dq}$: value that is d-axis magnetic flux differentiated by q-axis current From the expression (10), the following expressions (13) and (14) are acquired when the sine component n and the cosine component m are expressed by an angle θ.

[Expression 13]

$$n = \frac{d}{dt}I_{\alpha h V\alpha} - \frac{d}{dt}I_{\beta h V\beta} = l\sin2\theta + L_x\cos2\theta \quad (13)$$

[Expression 14]

$$m = -\frac{d}{dt}I_{\alpha h V\beta} - \frac{d}{dt}I_{\beta h V\alpha} = l\cos2\theta - L_x\sin2\theta \quad (14)$$

When the above expressions (13) and (14) are applied to expression (2), the interference coefficient c is expressed by the following equation.

[Expression 15]

$$c = \frac{L_x}{l} \quad (15)$$

When Lx and l are eliminated from the above expressions (13), (14), and (15), the following expression (16) is acquired.

[Expression 16]

$$c = \frac{n\cos2\theta - m\sin2\theta}{n\sin2\theta + m\cos2\theta} \quad (16)$$

In the above expression (16), n and m are calculated based on the response information in a manner of expressions (3) and (4). However, cos 2θ and sin 2θ cannot be calculated based on the response information. Here, when a value of a previous sampling period is applied to cos 2θ and sin 2θ, the expression (9) is acquired.

With reference to expression (9), when the response information is used for calculation of the interference coefficient c, it is considered that the interference coefficient c fluctuates due to a noise or the like in current measurement by the current detector 8. In such a case, the angle calculation module 33 may multiply the interference coefficient c by an arbitrary coefficient larger than 0 and smaller than 1, and may calculate the angle estimation value θ by the following expression (17).

[Expression 17]

$$\theta = \frac{1}{2}\tan^{-1}\left(\frac{n - kcm}{kcn + m}\right) \quad (17)$$

k: constant number satisfying 0<k<1

Figure 3:
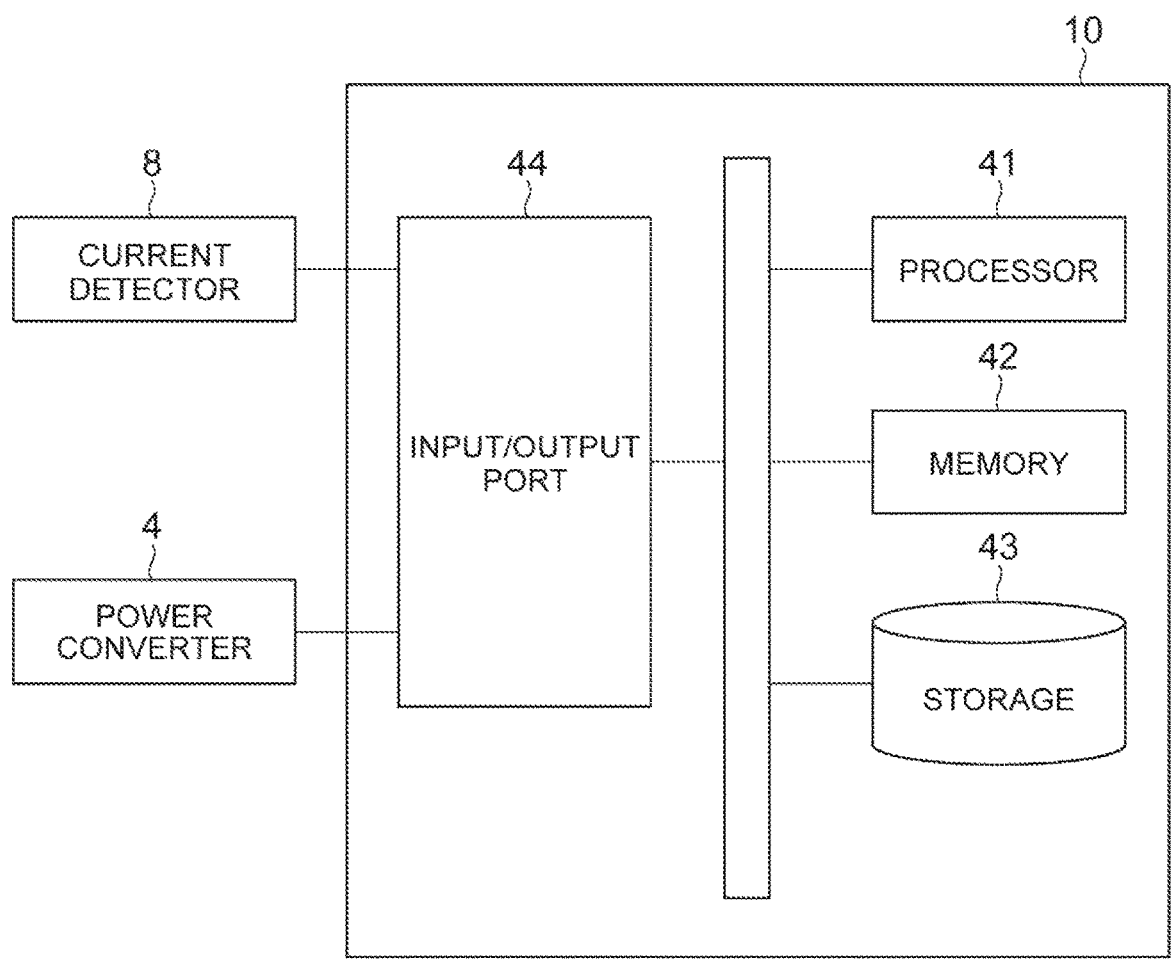
FIG. 3 is a view illustrating a hardware configuration of the control device.

FIG. 3 is a block diagram illustrating an example of a hardware configuration of the controller 10. As illustrated in FIG. 3, the controller 10 includes one or a plurality of processors 41, a memory 42, storage 43, and an input/output port 44. The storage 43 records a program to configure each of the functional modules of the controller 10. The storage 43 may include any memory device that is readable by a computer, such as a hard disk, a non-volatile semiconductor memory, a magnetic disk, and an optical disk. The memory 42 temporarily stores a program loaded from the storage 43, an operation result of the processor 41, and the like. The processor 41 configures each functional module by executing a program in cooperation with the memory 42. The input/output port 44 inputs/outputs an electric signal into/from the power converter 4 and the current detector 8 according to a command from the processor 41.

[Control Method]

An example control procedure executed by the controller 10 may include repeatedly calculating an angle estimation value correlated with a magnetic pole position of the rotating electric machine 3, and storing the angle estimation value. Calculating an angle estimation value may include calculating response information indicating a current change resulting from a change in an output voltage to the rotating electric machine 3 or a voltage change resulting from a change in an output current to the rotating electric machine 3. Additionally, calculating an angle estimation value may include calculating an angle estimation value based on the response information and a past angle estimation value stored in the storage module 25. In some examples, calculating an angle estimation value may include calculating an interference coefficient correlated with electromagnetic mutual interference between coordinate axes of the orthogonal coordinate system of the rotating electric machine 3 based on an angle estimation value stored in the past, and calculating an angle estimation value based on the response information and the interference coefficient.

Figure 4:
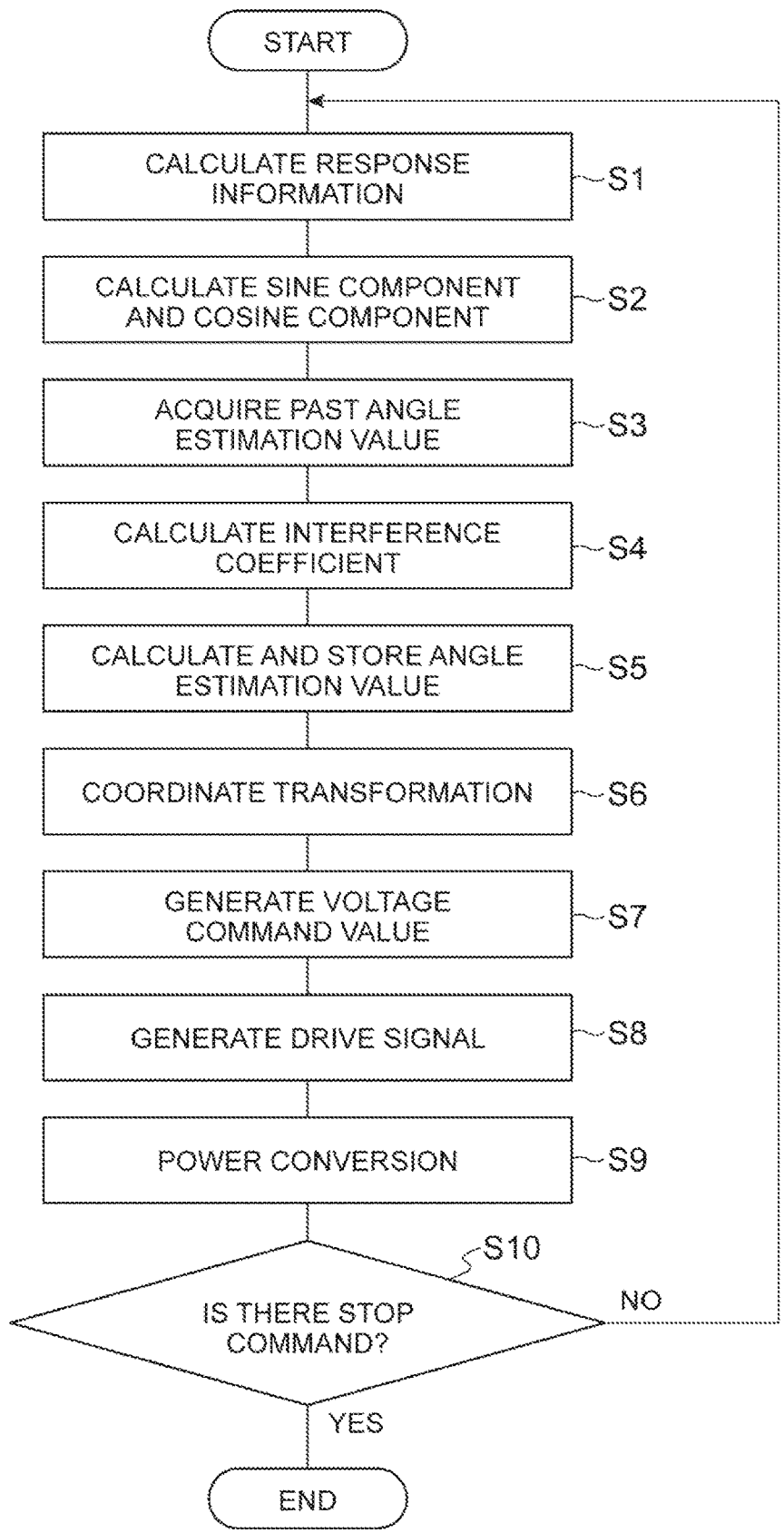
FIG. 4 is a flowchart illustrating an example control method.

An example control method executed by the controller 10 will be described with reference to FIG. 4. In step S1, the response information calculation module 32 calculates response information. For example, the response information calculation module 32 calculates $(d/dt)I_{\alpha h V\alpha}$, $(d/dt)I_{\alpha h V\beta}$, $(d/dt)I_{\beta h V\alpha}$, and $(d/dt)I_{\beta h V\beta}$.

In step S2, the component calculation module 34 calculates a sine component n and a cosine component m based on expression (3) and expression (4).

In step S3, the coefficient calculation module 35 acquires a past angle estimation value from the storage module 25. The past angle estimation value is, for example, an angle estimation value θ[k−1] in a previous sampling period of the object sampling period.

In step S4, the coefficient calculation module 35 calculates an interference coefficient c based on expression (10).

In step S5, the angle calculation module 33 calculates an angle estimation value θ based on expression (2). Also, the angle calculation module 33 controls the storage module 25 to store the calculated angle estimation value θ.

In step S6, the rotational coordinate transformation module 26 performs coordinate transformation of an α-axis current detection value $I_\alpha$ and a β-axis current detection value $I_\beta$ by using the angle estimation value θ calculated by the angle calculation module 33. Additionally, the rotational coordinate transformation module 26 calculates a d-axis current detection value $I_d$ and a q-axis current detection value $I_q$, and outputs these values to the current control module 22.

In step S7, the current control module 22 generates an α-axis voltage command value $V_\alpha^*$ and a β-axis voltage command value $V_\beta^*$ based on a d-axis current command value $I_d^*$ and a q-axis current command value $I_q^*$ from the current command generation module 21. Additionally, the α-axis voltage command value $V_\alpha^*$ and the β-axis voltage command value $V_\beta^*$ are generated based on the d-axis current detection value $I_d$ and the q-axis current detection value $I_q$ from the rotational coordinate transformation module 26.

In step S8, the drive signal generation module 23 generates drive signals SG1 to SG6 according to voltage command values that are the α-axis voltage command value $V_\alpha^*$ and the β-axis voltage command value $V_\beta^*$. In some examples, a high-frequency voltage is superimposed on the α-axis voltage command value $V_\alpha^*$ and the β-axis voltage command value $V_\beta^*$ by the superimposition module 31.

In step S9, based on the drive signals SG1 to SG6, the power converter 4 converts DC power supplied by the DC power supply 2 into AC power and outputs this power to the rotating electric machine 3.

In step S10, the controller 10 determines whether a stop command is input from the outside. In a case where it is determined in step S10 that the stop command is not input, the controller 10 returns the processing to step S1. Thereafter, the processing in step S1 to S10 may be repeated until the stop command is input.

In a case where it is determined in step S10 that the stop command is input, the controller 10 ends the control processing of the power converter 4. This is the end of the control procedure by the controller 10.

As described above, an example control device 1 may include an estimation module 30 configured to repeatedly calculate an angle estimation value correlated with a magnetic pole position of a rotating electric machine 3, and a storage module 25 configured to store the angle estimation value. The estimation module 30 includes a response information calculation module 32 configured to calculate response information indicating a current change resulting from a change in an output voltage to the rotating electric machine 3 or a voltage change resulting from a change in an output current to the rotating electric machine 3. Additionally, the estimation module 30 may include a coefficient calculation module 35 configured to calculate an interference coefficient correlated with electromagnetic mutual interference between coordinate axes of an orthogonal coordinate system of the rotating electric machine 3 based on a past angle estimation value stored in the storage module 25. The estimation module 30 may further include an angle calculation module 33 configured to calculate an angle estimation value based on the response information and the interference coefficient.

An interference coefficient correlated with mutual interference may be derived by using a past angle estimation value. Additionally, an angle estimation value, to which an influence of the mutual interference is added, may be calculated by combining the interference coefficient with the response information. Thus, the control device 1 is effective for highly accurate calculations of an angle estimation value related to a magnetic pole position of the rotating electric machine 3 in a sensorless manner.

The coefficient calculation module 35 may calculate an interference coefficient based on a past angle estimation value stored in the storage module 25, and response information. In this case, since the response information that is a present value is also used in addition to the past angle estimation value in calculation of the interference coefficient, it is possible to further improve accuracy of the angle estimation value compared to a case where only the past angle estimation value is used.

The control device 1 may further include a component calculation module 34 configured to calculate, based on response information, a sine component of an angle estimation value of a case where mutual interference is ignored. Additionally, the component calculation module 34 may be configured to calculate a cosine component of the angle estimation value of a case where the mutual interference is ignored. In some examples, the angle calculation module 33 may calculate an angle estimation value by using the sine component, the cosine component, and the interference coefficient.

The coefficient calculation module 35 may calculate an interference coefficient based on the sine component, the cosine component, and the past angle estimation value stored in the storage module.

The estimation module 30 may further include a superimposition module 31 configured to superimpose a high-frequency signal on an output voltage or an output current to the rotating electric machine 3. The response information calculation module 32 may extract a component associated with the high-frequency signal, from a current change resulting from the output voltage to the rotating electric machine 3, or from a voltage change resulting from the output current. In this case, it is possible to further improve accuracy of an angle estimation value by superimposing a high-frequency signal suitable for sensing.

In some examples, the control device 1 may not include the superimposition module 31. In this case, a response information calculation module 32 uses, as a signal for detection, a component of at least a part of an α-axis voltage command value $V_\alpha^*$ and a β-axis voltage command value $V_\beta^*$ output from a current control module 22, and calculates response information indicating a current change.

A component calculation module 34 calculates the above-described sine component n and cosine component m, for example, by the following expression (18).

[Expression 18]

$$\begin{bmatrix} n \\ m \end{bmatrix} = \begin{bmatrix} \dfrac{dI_{\alpha hR}}{dt} \\ \dfrac{dI_{\beta hR}}{dt} \end{bmatrix} \quad (18)$$

$dI_{\alpha hR}/dt$ and $dI_{\beta hR}/dt$ in the above expression (18) are expressed by the following equation.

[Expression 19]

$$\begin{bmatrix} \frac{dI_{\alpha hR}}{dt} \\ \frac{dI_{\beta hR}}{dt} \end{bmatrix} = R \begin{bmatrix} \frac{dI_{\alpha hrVa}}{dt} - \frac{dI_{\alpha hrVb}}{dt} \\ \frac{dI_{\beta hrVa}}{dt} - \frac{dI_{\beta hrVb}}{dt} \end{bmatrix} \quad (19)$$

$$= \begin{bmatrix} \cos(\theta_{Va} + \theta_{Vb}) & -\sin(\theta_{Va} + \theta_{Vb}) \\ \sin(\theta_{Va} + \theta_{Vb}) & \cos(\theta_{Va} + \theta_{Vb}) \end{bmatrix} \begin{bmatrix} \frac{dI_{\alpha hrVa}}{dt} - \frac{dI_{\alpha hrVb}}{dt} \\ \frac{dI_{\beta hrVa}}{dt} - \frac{dI_{\beta hrVb}}{dt} \end{bmatrix}$$

In the expression (19), Va and Vb are two voltage vectors of a space vector modulation system. Vectors Va and Vb extend in two directions crossing on a rotational plane of a rotator of a rotating electric machine 3. For example, Va is a voltage in a normal phase direction of one phase in a three-phase AC, and Vb is a voltage in a reverse phase direction of a different one phase in the three-phase AC.

The other signs in the expression (19) respectively have the following meanings.

$\theta_{Va}$: angle of Va
$\theta_{Vb}$: angle of Vb
$I_{\alpha hrVa}$: current in which the α-axis component of current to output Va is rotated by angle $\theta_{Va}$ of Va
$I_{\beta hrVa}$: current in which the β-axis component of current to output Va is rotated by angle $\theta_{Va}$ of Va
$I_{\alpha hrVb}$: current in which the α-axis component of current to output Vb is rotated by angle $\theta_{Vb}$ of Vb
$I_{\beta hrVb}$: current in which the β-axis component of current to output Vb is rotated by angle $\theta_{Vb}$ of Vb
$I_{\alpha hR}$: current in which the difference between current $i_{\alpha hrVa}$ and $i_{\alpha hrVb}$ is rotated by angle $\theta_{Va}+\theta_{Vb}$
$I_{\beta hR}$: current in which the difference between current $i_{\beta hrVa}$ and $i_{\beta hrVb}$ is rotated by angle $\theta_{Va}+\theta_{Vb}$
R: rotation matrix in which the vector on the αβ plane is rotated by angle $\theta_{Va}+\theta_{Vb}$ A calculation method of an interference coefficient by a coefficient calculation module 35 and a calculation method of an angle estimation value by an angle calculation module 33 are similar to those of a case where the control device 1 includes the superimposition module 31.

[Evaluation of Angle Estimation Value]

Evaluation of the accuracy of an angle estimation value calculated by the angle calculation module 33 was performed by utilization of a control device which does not include the superimposition module 31. In some examples, an angle is calculated by the angle calculation module 33 and a magnetic pole position (angle between the magnetic pole direction of a rotator of the rotating electric machine 3 and the coordinate system fixed to a stator of the rotating electric machine 3) is measured by a sensor. The accuracy of an estimation value of the magnetic pole position was evaluated with reference to an actual measured value of the magnetic pole position.

Figure 5:
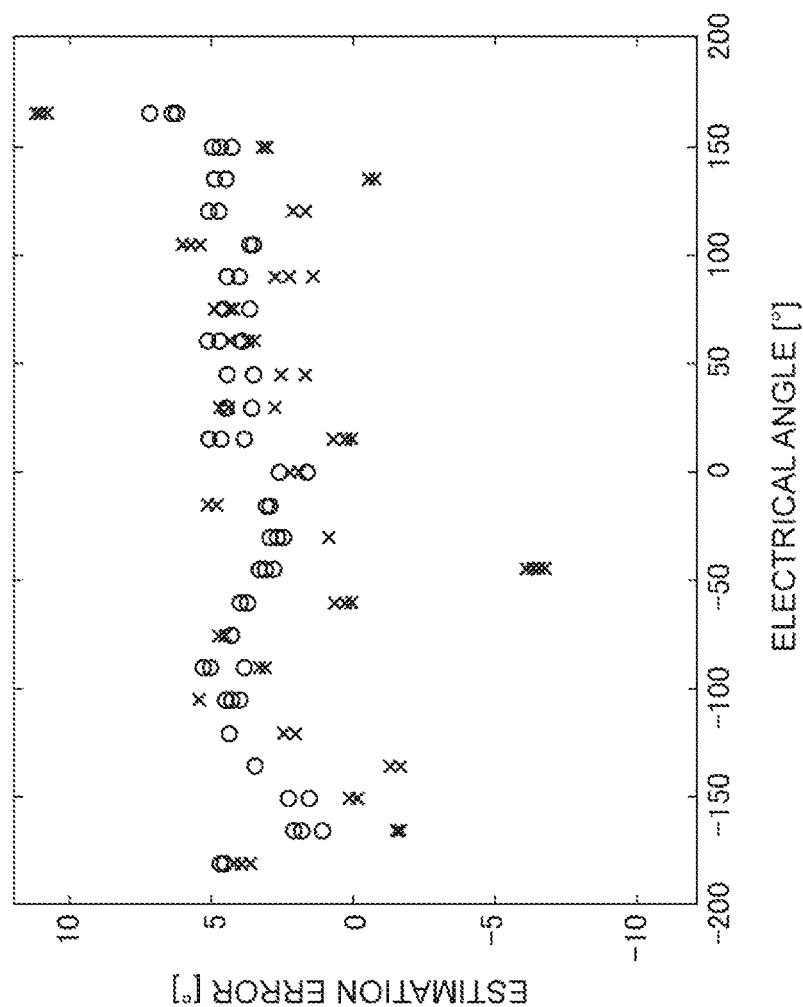
FIG. 5 is a graph illustrating an estimation error of an angle of a magnetic pole position.

FIG. 5 is a graph illustrating an estimation error of an angle of a magnetic pole position. The horizontal axis indicates an electrical angle (unit: °) and the vertical axis indicates an estimation error (unit: °). The estimation error is a difference between an estimation value and an actual measured value of the magnetic pole position. A plot of a ○ sign indicates an error of an angle estimation value calculated by the above expressions (18), (19), (9), and (2). A plot of a x sign indicates an error of an angle estimation value of a case where an interference coefficient c is zero (case where mutual interference between d-axis and q-axis is ignored) for comparison. As illustrated in FIG. 5, a scattered region of the ○ signs in a vertical axis direction is obviously smaller than a scattered region of the x signs in the vertical axis direction. From this result, it is understood that an estimation error is reduced by angle estimation considering mutual interference between the d-axis and the q-axis.

FIG. 6A to FIG. 6D are graphs illustrating an estimation value and an actual measured value of angular velocity and an angle of the magnetic pole position. In each of FIG. 6A and FIG. 6C, the horizontal axis indicates elapsed time and the vertical axis indicates angular velocity. In each of FIG. 6B and FIG. 6D, the horizontal axis indicates elapsed time and the vertical axis indicates an angle.

Figure 6A:
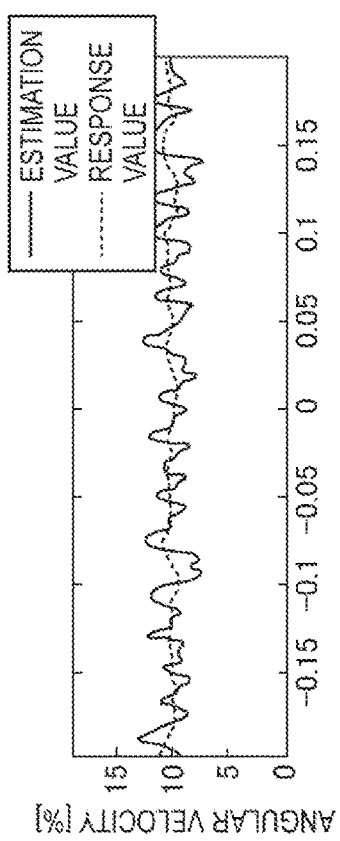
FIG. 6A to FIG. 6D are graphs illustrating an estimation value and an actual measured value of angular velocity and an angle of the magnetic pole position.
Figure 6B:
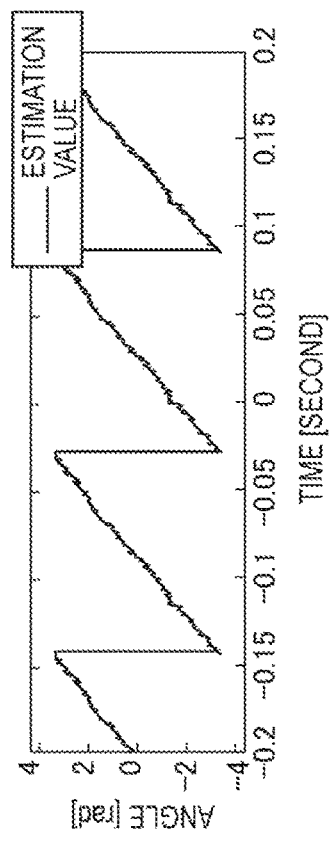
Figure 6C:
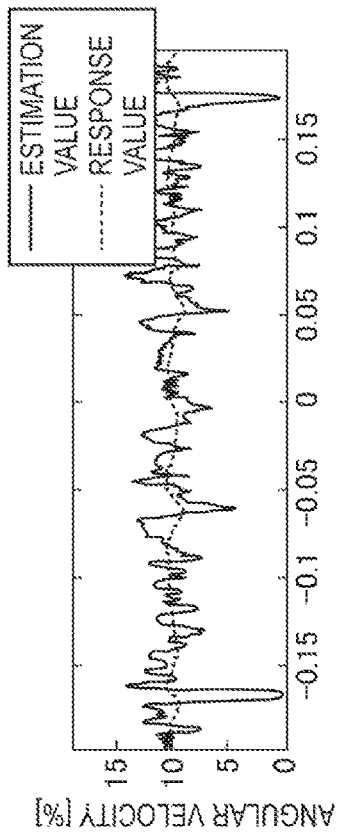
Figure 6D:
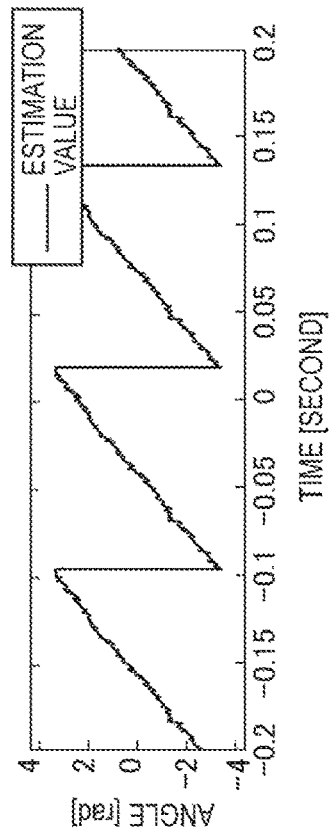

The solid line graph in FIG. 6D indicates an angle estimation value calculated by the above expressions (18), (19), (9), and (2). The solid line graph in FIG. 6C indicates a derivative of the angle estimation value in FIG. 6D. The broken line graph in FIG. 6C indicates an actual measured value (response value) of angular velocity of the magnetic pole position.

The solid line graph in FIG. 6B indicates an angle estimation value of a case where an interference coefficient c is zero (case where mutual interference between d-axis and q-axis is ignored). The solid line graph in FIG. 6A indicates a derivative of the angle estimation value in FIG. 6B. The broken line graph in FIG. 6A indicates an actual measured value (response value) of angular velocity of the magnetic pole position.

In FIG. 6C, the difference between the solid line graph and the broken line graph is small compared to that in FIG. 6A. From this result, it is also understood that an estimation error is reduced by angle estimation considering mutual interference between the d-axis and the q-axis. Moreover, fluctuation of the broken line graph is reduced in FIG. 6C compared to that in FIG. 6A because a variation in output power due to an estimation error of the magnetic pole position is reduced.

It is to be understood that not all aspects, advantages and features described herein may necessarily be achieved by, or included in, any one particular example embodiment. Indeed, having described and illustrated various examples herein, it should be apparent that other examples may be modified in arrangement and detail. For example, a control device 1 may be a matrix converter that is placed between an AC power supply and an electric motor and that converts AC power supplied by the AC power supply into three-phase AC power for driving the electric motor. Additionally, although some examples discuss the relative change of current with respect to a change in voltage in calculating response information, the relative changes between other electrical properties associated with the electric motor such as resistance, inductance, power, other electrical properties, or any combination thereof, may also be used to calculate response information.

We claim all modifications and variations coming within the spirit and scope of the subject matter claimed herein.

What is claimed is:

1. A control device comprising:
   a power converter configured to convert electric power of a power supply into electric power for driving an electric motor; and
   a controller configured to repeatedly calculate an angle estimation value correlated with a magnetic pole position of the electric motor and to store the angle estimation value,
   wherein the controller is further configured to:
      calculate response information indicating a change in an output current resulting from a change in an output voltage or a change in the output voltage resulting from a change in the output current, calculate an interference coefficient based on a past angle estimation value which is stored by the controller, the interference coefficient being correlated with an electromagnetic mutual interference between coordinate axes associated with an orthogonal coordinate of the electric motor, and calculate the angle estimation value based on the response information and the interference coefficient to compensate for an angle estimation error resulting from the electromagnetic mutual interference.

2. The control device according to claim 1, wherein the controller is further configured to calculate the interference coefficient based on the past angle estimation value stored by the controller and the response information.

3. The control device according to claim 2, wherein the controller is further configured to:

calculate, based on the response information, a sine component of the angle estimation value excluding the electromagnetic mutual interference, calculate, based on the response information, a cosine component of the angle estimation value excluding the electromagnetic mutual interference, and calculate the angle estimation value by using the sine component, the cosine component, and the interference coefficient.

4. The control device according to claim 3, wherein the controller is configured to calculate the angle estimation value based on a corrected sine component and a corrected cosine component, the corrected sine component comprising the sine component corrected by using the interference coefficient and the cosine component, and the corrected cosine component comprising the cosine component corrected by using the interference coefficient and the sine component.

5. The control device according to claim 3, wherein the controller is configured to calculate the interference coefficient based on the sine component, the cosine component, and the past angle estimation value stored by the controller.

6. The control device according to claim 1, wherein the controller is configured to calculate the response information in a coordinate system fixed to a stator of the electric motor.

7. The control device according to claim 1, wherein the controller is further configured to:

superimpose a high-frequency signal on the output voltage associated with the electric motor, and extract a signal associated with the high-frequency signal, as the response information, from the output current.

8. The control device according to claim 1, wherein the controller is configured to calculate the response information indicating a change in the output current resulting from a change in the output voltage.

9. The control device according to claim 8, wherein the controller is further configured to:

superimpose a high-frequency signal on the output voltage, and extract a signal associated with the high-frequency signal, as the response information, from the output current.

10. The control device according to claim 1, wherein the controller is further configured to:

superimpose a high-frequency signal on the output current associated with the electric motor, and extract a signal associated with the high-frequency signal, as the response information, from the output voltage.

11. A control method comprising:

repeatedly calculating an angle estimation value correlated with a magnetic pole position of an electric motor; and storing the angle estimation value, wherein calculating the angle estimation value includes:

calculating response information indicating a change in an output current resulting from a change in an output voltage or a change in the output voltage resulting from a change in the output current, calculating an interference coefficient based on a stored angle estimation value, the interference coefficient being correlated with an electromagnetic mutual interference between coordinate axes associated with an orthogonal coordinate of the electric motor, and calculating the angle estimation value based on the response information and the interference coefficient to compensate for an angle estimation error resulting from the electromagnetic mutual interference.

12. The control method according to claim 11, wherein calculating the angle estimation value further includes:

superimposing a high-frequency signal on the output voltage associated with the electric motor, and extracting a signal associated with the high-frequency signal, as the response information, from the output current.

13. The control method according to claim 11, wherein calculating the angle estimation value further includes:

superimposing a high-frequency signal on the output current associated with the electric motor, and extracting a signal associated with the high-frequency signal, as the response information, from the output voltage.

14. A non-transitory memory device having stored instructions that, in response to execution by a controller, cause the controller to perform operations comprising:

repeatedly calculating an angle estimation value correlated with a magnetic pole position of an electric motor, and storing the angle estimation value, wherein calculating the angle estimation value includes:

calculating response information indicating a change in an output current resulting from a change in an output voltage or a change in the output voltage resulting from a change in the output current, calculating an interference coefficient based on a stored angle estimation value, the interference coefficient being correlated with an electromagnetic mutual interference between coordinate axes associated with an orthogonal coordinate of the electric motor, and calculating the angle estimation value based on the response information and the interference coefficient to compensate for an angle estimation error resulting from the electromagnetic mutual interference.

15. The non-transitory memory device according to claim 14, wherein calculating the angle estimation value further includes:

superimposing a high-frequency signal on the output voltage associated with the electric motor, and extracting a signal associated with the high-frequency signal, as the response information, from the output current.

16. The non-transitory memory device according to claim 14, wherein calculating the angle estimation value further includes:

superimposing a high-frequency signal on the output current associated with the electric motor, and extracting a signal associated with the high-frequency signal, as the response information, from the output voltage.

\* \* \* \* \*